US012800457B2

(12) United States Patent
Rowe et al.

(10) Patent No.: US 12,800,457 B2
(45) Date of Patent: Nov. 17, 2026

(54) RHEOLOGICAL TESTING AND SELECTION OF CRACK AND JOINT SEALANTS

(71) Applicant: Adventus Material Strategies, LLC, Daniel Island, SC (US)

(72) Inventors: Geoffrey M. Rowe, Perkasie, PA (US); Joseph Drbohlav, III, Inman, SC (US)

(73) Assignee: Adventus Material Strategies, LLC, Daniel Island, SC (US)

( * ) Notice: Subject to any disclaimer, the term of this patent is extended or adjusted under 35 U.S.C. 154(b) by 278 days.

(21) Appl. No.: 18/404,300

(22) Filed: Jan. 4, 2024

(65) Prior Publication Data

US 2024/0230494 A1 Jul. 11, 2024

Related U.S. Application Data

(60) Provisional application No. 63/437,399, filed on Jan. 6, 2023.

(51) Int. Cl.
*G01N 3/24* (2006.01)
*G01N 3/20* (2006.01)

(52) U.S. Cl.
CPC ................. *G01N 3/24* (2013.01); *G01N 3/20* (2013.01)

(58) Field of Classification Search
CPC ........................................................ G01N 3/24
USPC ........................................................ 73/54.37
See application file for complete search history.

(56) References Cited

U.S. PATENT DOCUMENTS 2,213,806 A 9/1940 Sorem
3,112,681 A 12/1963 Gessler et al.
3,690,727 A 9/1972 Dagginger
4,629,754 A 12/1986 Syrier et al.
4,676,557 A 6/1987 Shope et al.
6,514,595 B1 2/2003 Sprouts
7,288,581 B2 10/2007 Ferrell et al.
(Continued)

FOREIGN PATENT DOCUMENTS

CN 102261260 11/2011
CN 202039263 11/2011
(Continued)

OTHER PUBLICATIONS

Anderson, David A., et al. "Binder characterization and evaluation, vol. 3: Physical characterization." Strategic Highway Research Program, National Research Council, Washington, DC (1994). (Year: 1994).*

(Continued)

*Primary Examiner* — Walter L Lindsay, Jr.
*Assistant Examiner* — Philip T Fadul
(74) *Attorney, Agent, or Firm* — Dennis D. Brown; Brown Patent Law, P.L.L.C.

(57) ABSTRACT

A method for testing and selecting a crack and joint sealant for superior performance in both hot and cold climates, as well as for superior ability to relax stress during crack or joint opening and closing, wherein the rheology of the crack and joint sealant composition is evaluated by (i) testing the sealant composition using dynamic shear testing in parallel plate mode at a plurality of frequencies for a plurality of temperatures and (ii) performing flexural testing in a 3-point bending mode at different temperatures, and using the results of these tests to produce a Black Space diagram and Master Curve for the sealant, and perform further analyses.

4 Claims, 7 Drawing Sheets

(56) References Cited

U.S. PATENT DOCUMENTS

| | | | |
|---|---|---|---|
| 7,514,018 B2 | 4/2009 | Schilling et al. | |
| 7,658,862 B2 | 2/2010 | Talamoni | |
| 8,088,858 B2 | 1/2012 | Pharr | |
| 8,381,483 B1 | 2/2013 | Goldman | |
| 8,814,465 B2 | 8/2014 | Vitale et al. | |
| 9,499,948 B2 | 11/2016 | Greer et al. | |
| 10,246,838 B1 | 4/2019 | Andrews et al. | |
| 11,572,472 B2 | 2/2023 | Majeska et al. | |
| 11,760,881 B1 | 9/2023 | Drbohlav, III et al. | |
| 2002/0058734 A1 | 5/2002 | Harlan | |
| 2005/0194566 A1 | 9/2005 | Schilling et al. | |
| 2006/0128838 A1 | 6/2006 | Ferral et al. | |
| 2007/0186778 A1 | 8/2007 | Peterson | |
| 2008/0017829 A1 | 1/2008 | Talamoni | |
| 2008/0168926 A1 | 7/2008 | Muller et al. | |
| 2008/0255290 A1 | 10/2008 | Rath et al. | |
| 2009/0023841 A1 | 1/2009 | Yamauchi | |
| 2009/0067924 A1 | 3/2009 | Kaul | |
| 2010/0184903 A1 | 7/2010 | Pharr | |
| 2010/0233146 A1 | 9/2010 | McDaniel | |
| 2011/0257318 A1 | 10/2011 | Neuville et al. | |
| 2012/0329934 A1 | 12/2012 | Bower et al. | |
| 2013/0248251 A1* | 9/2013 | Kulkarni | E21B 21/06 703/2 |
| 2014/0083331 A1 | 3/2014 | Fini | |
| 2015/0210882 A1 | 7/2015 | Burdzy et al. | |
| 2016/0264821 A1 | 9/2016 | Nelson et al. | |
| 2016/0304698 A1 | 10/2016 | Bindschedler | |
| 2017/0008803 A1 | 1/2017 | Muncy et al. | |
| 2017/0190619 A1 | 7/2017 | Crews | |
| 2017/0191008 A1 | 7/2017 | Baseeth | |
| 2018/0201716 A1 | 7/2018 | Kameda et al. | |
| 2018/0215919 A1 | 8/2018 | Reinke et al. | |
| 2018/0371704 A1 | 12/2018 | Wilkins et al. | |
| 2019/0177925 A1 | 6/2019 | Kriech et al. | |
| 2019/0226159 A1 | 7/2019 | Marienfeld et al. | |
| 2019/0256417 A1 | 8/2019 | Stepp et al. | |
| 2020/0032063 A1 | 1/2020 | Lungren et al. | |
| 2021/0206695 A1 | 7/2021 | Lorenc et al. | |
| 2023/0143069 A1 | 5/2023 | Majeska et al. | |
| 2023/0383477 A1 | 11/2023 | Drbohlav, III et al. | |
| 2023/0416531 A1 | 12/2023 | Drbohlav, III et al. | |

FOREIGN PATENT DOCUMENTS

| | | |
|---|---|---|
| CN | 105273691 | 1/2016 |
| CN | 109499229 | 3/2019 |
| CN | 209873531 | 12/2019 |
| CN | 111117569 | 8/2020 |
| FR | 2995890 | 3/2014 |
| JP | 1998219214 | 8/1998 |
| JP | 3817138 | 8/2006 |
| KR | 100665189 | 9/2005 |
| KR | 101820380 | 1/2018 |
| KR | 102054908 | 8/2018 |
| KR | 20180096037 | 8/2018 |

OTHER PUBLICATIONS

PCT/US2022/022487—International Preliminary Report With International Search Report and Written Opinion; Jun. 15, 2022.

PCT International Search Report and Written Opinion; PCT/US2020/044876; Oct. 8, 2020; US.

Crumb Rubber; Wikipedia (https://en.wikipedia.org/wiki/Crumb_rubber); p. 2; US.

U.S. Appl. No. 18/096,069; "Pigmentable, Non-Asphalt Based, Sealant Composition and Methods of Production and Use"; filed Jan. 12, 2023; Inventor; Brian J. Majeska.

* cited by examiner

RHEOLOGICAL TESTING AND SELECTION OF CRACK AND JOINT SEALANTS

RELATED CASE

This application claims the benefit of U.S. Provisional Patent Application Ser. No. 63/437,399 filed Jan. 6, 2023 and incorporates said provisional application by reference as if fully set out at this point.

FIELD OF THE INVENTION

The present invention relates to methods of testing, selecting, and applying sealant compositions for sealing cracks in roads, highways, and other pavement surfaces.

BACKGROUND OF THE INVENTION

Most crack and joint sealants are evaluated or specified for performance using empirical tests that indirectly probe the sealant's thermal and mechanical properties. For example, ASTM D5329 highlights the typical range of empirical properties that are used in most hot-applied crack and joint sealants sold and applied in the United States. ASTM D6690 is the most commonly referenced hot-applied crack and joint sealant specification used in the United States and this specification entirely references those empirical tests described in detail in ASTM D5329. Such empirical tests that are commonly used are the ring and ball softening point to assess high temperature resistance to flow and deformation, cone penetration to assess the flexibility of a sealant at intermediate temperatures, and resilience to measure a sealant's ability to reject a hard, incompressible object pressed into the surface of the applied sealant.

Such empirical tests, although useful to compare one sealant to another, have been wholly inadequate to effectively predict the performance of an applied sealant in field conditions where temperature variations may be extreme, and mechanical loading of the sealant can be excessive due to the crack or joint opening and closing.

Consequently, a need exists for an improved method of testing and selecting crack and joint sealant compositions for use in different environments.

In contrast to crack and joint sealant compositions, one method used for testing asphalt binder compositions for road paving materials has been to use a dynamic shear rheometer (DSR). DSRs have been used for characterizing and understanding high temperature rheological properties of asphalt binders in both the molten and solid states. This has been done by deriving the complex shear modulus (G*) of the asphalt binder from the storage modulus (elastic response, G') and loss modulus (viscous behavior, G") yielding G* as a function of stress over strain. It has been used to characterize the viscoelastic behavior of asphalt binders at intermediate temperatures from 10° to 150 °C (50° to 302 °F).

The basic DSR test uses a thin asphalt binder sample sandwiched between two circular plates. The lower plate is fixed while the upper plate oscillates back and forth across the sample to create a shearing action. The test is largely software controlled.

The standard dynamic shear rheometer (DSR) test for asphalt binders is AASHTO T 315: Determining the Rheological Properties of Asphalt Binder Using a Dynamic Shear Rheometer (DSR).

Asphalt binders are viscoelastic. This means they behave partly like an elastic solid (deformation due to loading is recoverable—it is able to return to its original shape after a load is removed) and partly like a viscous liquid (deformation due to loading is non-recoverable—it cannot return to its original shape after a load is removed). DSRs have been used to quantify both the elastic and viscous properties of asphalt binders.

The DSR measures a specimen's complex shear modulus (G*) and phase angle (δ). The complex shear modulus (G*) can be considered the sample's total resistance to deformation when repeatedly sheared, while the phase angle (δ) is the lag between the applied shear stress and the resulting shear strain. The larger the phase angle (δ), the more viscous the material. Phase angle (δ) limiting values are: (i) Purely elastic material: δ=0 degrees and (ii) Purely viscous material: δ=90 degrees For asphalt binders, a specified DSR oscillation rate of 10 radians/second (1.59 Hz) has been used to simulate the shearing action corresponding to a traffic speed of about 55 mph (90 km/hr). Specifically, to simulate the shearing action experienced by an asphalt binder at a traffic speed of 55 mph, the top plate of the DSR oscillates at 10 rad/sec (1.59 Hz) in a sinusoidal waveform while the equipment measures the maximum applied stress, the resulting maximum strain, and the time lag between them. The software then automatically calculates the complex modulus (G*) and phase angle (δ) in accordance with the following formulas:

$$\tau_{max} = \frac{2T}{\pi r^3}$$

$$\gamma_{max} = \frac{\theta r}{h}$$

Where: $\tau_{max}$=maximum applied stress; $\gamma_{max}$=maximum resultant strain; T=maximum applied torque; r=specimen radius (either 4 or 12.5 mm); θ=deflection (rotation) angle (in radians); and h=specimen height (either 1 or 2 mm).

Then, the complex shear modulus (G*) and phase angle (δ) are determined by:

$$G^* = \frac{\tau_{max}}{\gamma_{max}}$$

δ=time lag between occurrence of $\tau_{max}$ and $\gamma_{max}$

The phase angle cannot be less than 0° or greater than 90°. The time lag can be measured in seconds and then converted to an angular measurement by dividing it by the oscillation frequency and then multiplying by 360° (or 2× radians).

Another test used for evaluating asphalt binders used in road paving materials has been the Bending Beam Rheometer (BBR) test. For asphalt binders, the Bending Beam Rheometer (BBR) test applies a static stress to a beam of bitumen and measures the strain rate to derive the stiffness of the beam. The test provides a measure of low temperature stiffness and relaxation properties of the asphalt binder. These parameters give an indication of the binder's ability to resist low temperature cracking. The actual temperatures anticipated in the area where the asphalt binder will be placed typically determine the test temperatures used.

The basic BBR test uses a small asphalt beam that is simply supported and immersed in a cold liquid bath. A load is applied to the center of the beam and its deflection is measured against time. Stiffness is calculated based on measured deflection and standard beam properties and a measure of how the asphalt binder relaxes the load induced stresses is also measured.

For example, a sample of asphalt binder is typically molded into a beam measuring 0.246×0.492×5.000 inches (6.25×12.5×127 mm). This sample is then supported at two points 4.02 inches (102 mm) apart in a controlled temperature fluid bath. The beam is then loaded at the midpoint by a 0.22 lb (100 g) load that, under normal gravity conditions, produces 0.22 lb (0.98 N) of force. For asphalt binders and other materials, creep stiffness can be calculated using standard beam theory. The equation used is:

$$S(t)=(PL3)/4bh3\delta(t)$$

Where: S(t)=creep stiffness at a specific time; P=applied constant load (100 g or 0.98 N); L=distance between beam supports (102 mm); b=beam width (12.5 mm); h=beam thickness (6.25 mm); and δ(t)=deflection at a specific time.

In order to determine the creep stiffness of an asphalt binder, calculations are made at 8, 15, 30, 60, 120 and 240 seconds of loading. These times are about equally spaced on a logarithmic time scale. For each time, the asphalt binder creep stiffness is calculated and plotted. A curve is then fit to these points and is of the form:

$$S(t)=A+B(\log(t))+C[\log(t)]^2$$

Where: S(t)=asphalt binder stiffness; t=time; and A, B, C=empirically determined constants.

The slope of this stiffness curve, designated by the letter "m", is a measure of the rate at which the asphalt binder relieves stress through viscous flow.

SUMMARY OF THE INVENTION

We have invented an improved method for testing, grading, and/or selecting a crack and joint sealant for superior performance in both hot and cold climates, as well as for superior ability to relax stress during crack or joint opening and closing. The method involves formulating a crack and joint sealant and evaluating the rheology of the sealant using dynamic shear testing in parallel plate mode, as well as flexural testing in a 3-point bending mode.

In one aspect, the method preferably includes testing the dynamic shear properties of the sealant at multiple frequencies and temperatures in a Dynamic Shear Rheometer (DSR). The rheological data from the DSR is then combined with the stress relaxation properties from testing the sealant in a 3-point bending mode using a Bending Beam Rheometer (BBR). The combined BBR and DSR data are preferably used to construct "Black Space" diagrams for the sealant that highlight the overall rheological behavior of the material across a wide range of temperatures and frequencies of testing.

In another aspect, it is desirable that the sealant is selected for excellent thermal and stress relaxation performance using a Black Space diagram of the type shown in FIGS. 2 and 3, and that the sealant have high energy dissipation and relaxation properties as evidenced by phase angles in excess of 70° in the high stiffness region, while the material is conforming to solid viscoelastic behavior. This type of behavior should occur for the majority of the ambient conditions associated with joint opening and closing with temperature effects. In addition, for good cracking resistance in the field, the material will preferably exhibit minimum requirements for phase angles in certain temperature regions. For the absolute cold temperature in a climate zone, the phase angle will preferably be at least above 27° and preferably above 30° to ensure cracking resistance is maintained.

In another aspect, there is provided a method of determining a suitability of a composition for sealing cracks and joints in pavement surfaces. The method preferably comprises deriving a rheological profile of the composition over a stiffness range of from at least as low as 10,000 Pa to at least as high as 100,000,000 Pa. The rheological profile of the composition is preferably derived by a process comprising the steps of: (a) testing the composition in a Dynamic Shear Rheometer (DSR) at a plurality of selected DSR test frequencies, in a range of from 0.01 radians/second to 10 radians/second, for a plurality of selected DSR test temperatures, in a range of from 0 °C and 100 °C, to determine values of a maximum applied stress, a maximum resultant strain, and a time lag between occurrence of the maximum applied stress and the maximum resultant strain, for the selected DSR test frequencies at the selected DSR test temperatures; (b) calculating complex shear modulus (G*) values of the composition, for the selected DSR test frequencies at the selected DSR test temperatures, using the values of the maximum applied stress and the maximum resultant strain determined in step (a); and (c) determining phase angle (δ) values of the composition, for the selected DSR test frequencies at the selected DSR test temperatures, using the time lag between occurrence of the maximum applied stress and the maximum resultant strain determined in step (a).

The method can also optionally include a step (d) of testing the composition in a Bending Beam Rheometer (BBR) at a plurality of selected BBR test temperatures in a range of from −40 °C to 0 °C to determine (i) higher stiffness values of the composition for the selected BBR test temperatures and (ii) a bending creep stiffness of the composition over a loading time of from 0 seconds to 240 seconds, and using, by transposition, the higher stiffness values and the bending creep stiffness to provide complex shear modulus (G*) values and phase angle (δ) values using frequencies for transposition (expressed in radians per second) which are an inverse of the loading time.

The method preferably also comprises the steps of: (e) calculating, using the complex shear modulus (G*) values calculated in step (b) and the phase angle (δ) values determined in step (c), as well as the complex shear modulus (G*) values and the phase angle (δ) values provided by step (d) if conducted, a Master Curve for the composition that shows a relationship between complex shear modulus (G*) and phase angle (δ) for the composition expressed as a function of frequency and temperature; (f) using the complex shear modulus (G*) values calculated in step (b) and the phase angle (δ) values determined in step (c), as well as the complex shear modulus (G*) values and the phase angle (δ) values provided step (d) if conducted, to construct a Black Space Diagram that shows a relationship between complex shear modulus (G*) and phase angle (δ) for the composition corresponding to an entire range of the selected DSR test temperatures and the selected DSR test frequencies; and (g) adding a phase angle evaluation line to the Black Space Diagram demarking a level of desired performance.

In another aspect, the method can optionally also comprise: (i) the phase angle evaluation line being a line that connects the ordinates δ=27/G*=100 MPa and δ=70/G*=1 MPa; (ii) determining whether the phase angle (δ) of the composition shown on the Black Space Diagram is always above the phase angle evaluation line; (iii) determining whether the phase angle (δ) of the composition on the Black Space Diagram is at least 30° when the complex shear modulus (G*) value of the composition is 100,000,000 Pa; (iv) determining whether the phase angle (δ) of the composition on the Black Space Diagram is at least 30° when the complex shear modulus (G*) value of the composition is 1,000,000 Pa; and/or determining whether the composition demonstrates viscoelastic solid behavior, as determined by the fitting the Master Curve of the composition to the rheological profile of the composition at complex shear modulus (G*) values greater than 10,000 Pa, and determining whether the Master Curve of the composition conforms to a sigmoid curve, with a root mean square error of less than 15%.

In another aspect, there is provided a method for testing and selecting a crack and joint sealant composition which preferably comprises the steps of: (a) forming a sealant composition for evaluation; (b) testing the sealant composition in a Bending Beam Rheometer (BBR) for a high stiffness temperature region (typically 0° to −40 °C); (c) testing the sealant composition in a Dynamic Shear Rheometer (DSR) in an intermediate to low stiffness temperature region (typically 0° to 100 °C); (d) using the BBR and DSR results to form a Black Space diagram of the complex shear modulus G* versus the phase angle δ for the sealant composition; (e) producing a Master Curve which enables a determination of the dynamic properties (G* and δ) of the sealant composition at any loading frequency or equivalent loading time; (f) calculating the relaxation ability of the sealant composition at critical loading times; and/or (g) using the Master Curve to evaluate viscoelastic transitions and relaxation capacity of the sealant composition.

In another aspect, there is provided a method of evaluating and selecting a sealant composition comprising the steps of: (i) determining whether the sealant composition has a phase angle δ>30° when the G* of the sealant composition is 100 MPa; (ii) determining whether the sealant composition has a phase angle δ>70° when the G* of the sealant composition is 1 MPa; (iii) determining whether the phase angle δ of the sealant composition is greater than a value dictated by a line connecting points of 30°/100 MPa and 70°/1 MPa; (iv) determining whether the sealant composition has a phase angle greater that 27° when a loading frequency equivalent to a critical loading time of 7200 seconds is considered calculated from the temperature at the peak value minus 14 °C (degrees Celsius); and/or (v) determining whether the sealant composition acts as a viscoelastic solid when the stiffness of the sealant composition is greater than 10,000 Pa (i.e., the root mean square error of the fit of the Master Curve (the curve of the complex shear modulus of the composition versus frequency) at a reference temperature of 25 °C, in comparison to the sigmoid equation, is less than 15%).

Further aspects, features, and advantages of the present invention will be apparent to those in the art upon examining the accompanying drawings and upon reading the following detailed description of the preferred embodiments.

DETAILED DESCRIPTION OF THE PREFERRED EMBODIMENTS

Figure 1:
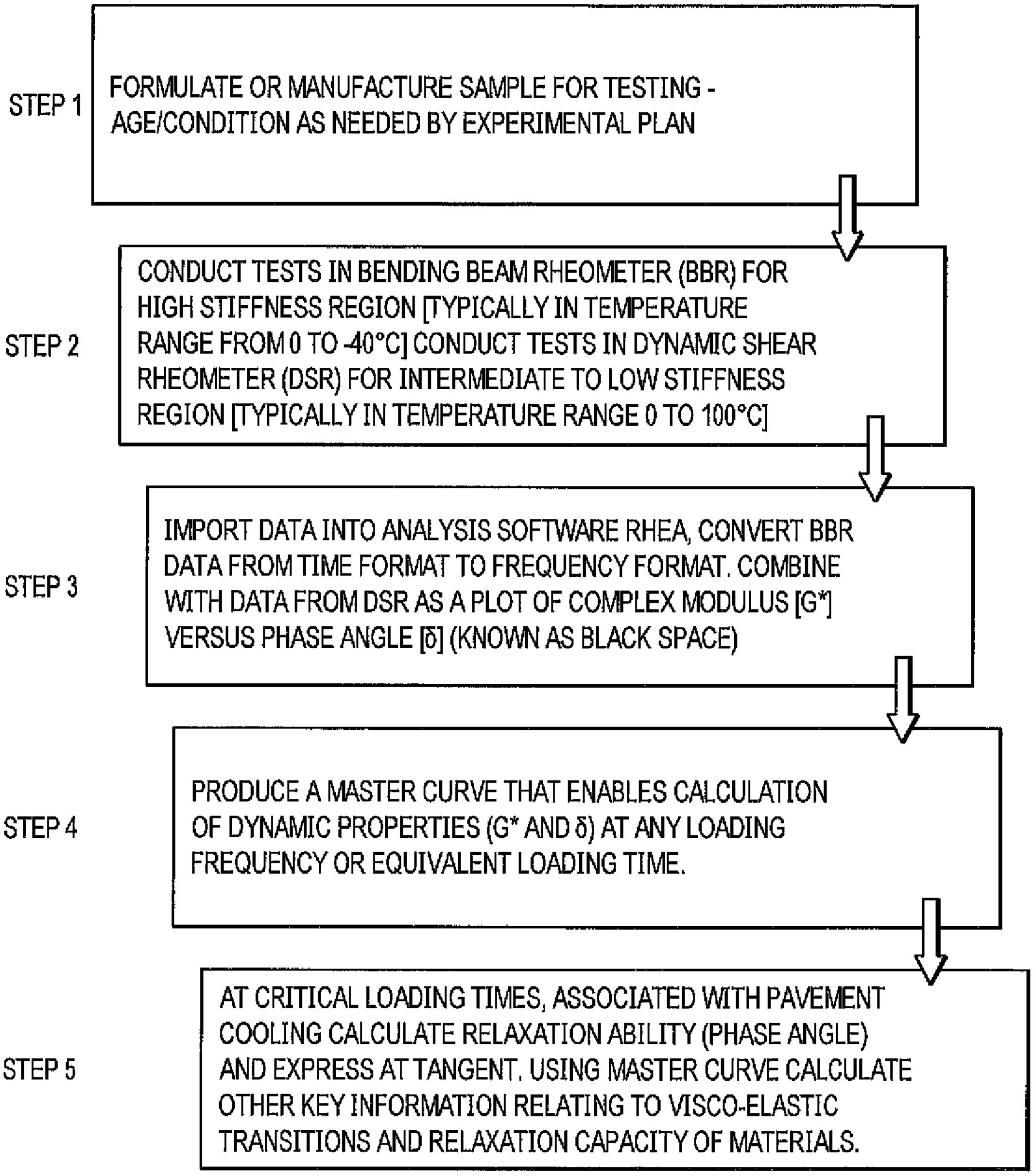
FIG. 1 is a flow chart showing a preferred embodiment of the inventive method.

We have discovered that full rheological characterization of a crack and joint sealant using rheometers to characterize the performance over a range of shear stiffnesses values (G*) from typically 1e8 to 1e2 Pa more adequately predicts the sealant's performance, although this range can be extended in certain cases to 1e9 to 1e0.

In accordance with our inventive method for testing and selecting crack and joint sealants, we use parallel plate mode dynamic shear testing in a DSR, combined with low temperature stress relaxation in a 3-point bending mode using the BBR to provide a superior means of probing a sealant's viscoelastic behavior and ability to relax stress and resist cracking or fracturing under extreme mechanical loads.

The inventive method first involves the formulation of a sealant using the appropriate raw materials to provide a sealant that would be likely to have exceptional thermal and rheological properties. Those skilled in the art of sealant formulating are familiar with a wide range of base resins, plasticizing oils, and polymers available to formulate a sealant of acceptable performance. It is not the purpose of this invention to specify specific formulations for exceptional rheology. Rather, the formulator can use asphalt or other naturally occurring base resins, for example pine tree-derived rosin ester resins, to arrive at a suitable formulation for exceptional rheological performance as evaluated using the inventive testing method.

The method involves testing the formulated sealant in parallel plate dynamic shear using a DSR at temperatures from about 0 °C to about 100 °C, more preferably from about 5 °C to about 95 °C, using frequencies or shear rates ranging from about 0.01 radians/second to about 10 radians/second. In a more preferred embodiment of practicing the inventive method, the DSR testing is accomplished by running a series of "Frequency Sweeps" where the sealant is preferably probed at temperatures of from about 5 °C to 95 °C at 10 °C increments, using frequencies preferably ranging from 0.01 radians/second to 10 radians/second at each temperature and wherein each logarithmic level of frequency testing preferably includes about 2-4 discrete frequency levels, for example: 0.01 radians/second, 0.04 radians/second, 0.07 radians/second, 0.1 radians/second, 0.4 radians/second, 0.7 radians/second, 1.0 radians/second, 4.0 radians/second, 7.0 radians/second, 10 radians/second, etc. The testing using multiple frequencies at multiple temperatures is used to produce a master curve of G* versus frequency.

In addition to the rheological data collected using the DSR Frequency Sweeps, the inventive method also preferably includes the measurement of low temperature stress relaxation properties of the sealant in 3-point bending mode using the BBR. In a preferred embodiment of practicing the inventive method, the sealant is tested at about three discrete temperatures in the BBR from about 0 °C to −40 °C. Most preferably, the sealant is tested for low temperature stress relaxation properties in the BBR using temperatures ranging from about −6 °C to −24 °C. In the most preferred embodiment of practicing the inventive method, the sealant is characterized for stress relaxation properties at three distinct temperatures: preferably −12 °C, −18 °C, and −24 °C In the next step of practicing the inventive method, the rheological data from the DSR and the rheological data from the BBR are combined using mathematical models known to those skilled in the art of practicing rheology to construct "Master Curves" that show the relationship between material stiffness or modulus vs. frequency of testing. As is well known by those in the art, a Master Curve contains the full rheological characterization of the material's stiffness across the full range of temperatures and frequencies (rates of loading) tested.

Figure 2:
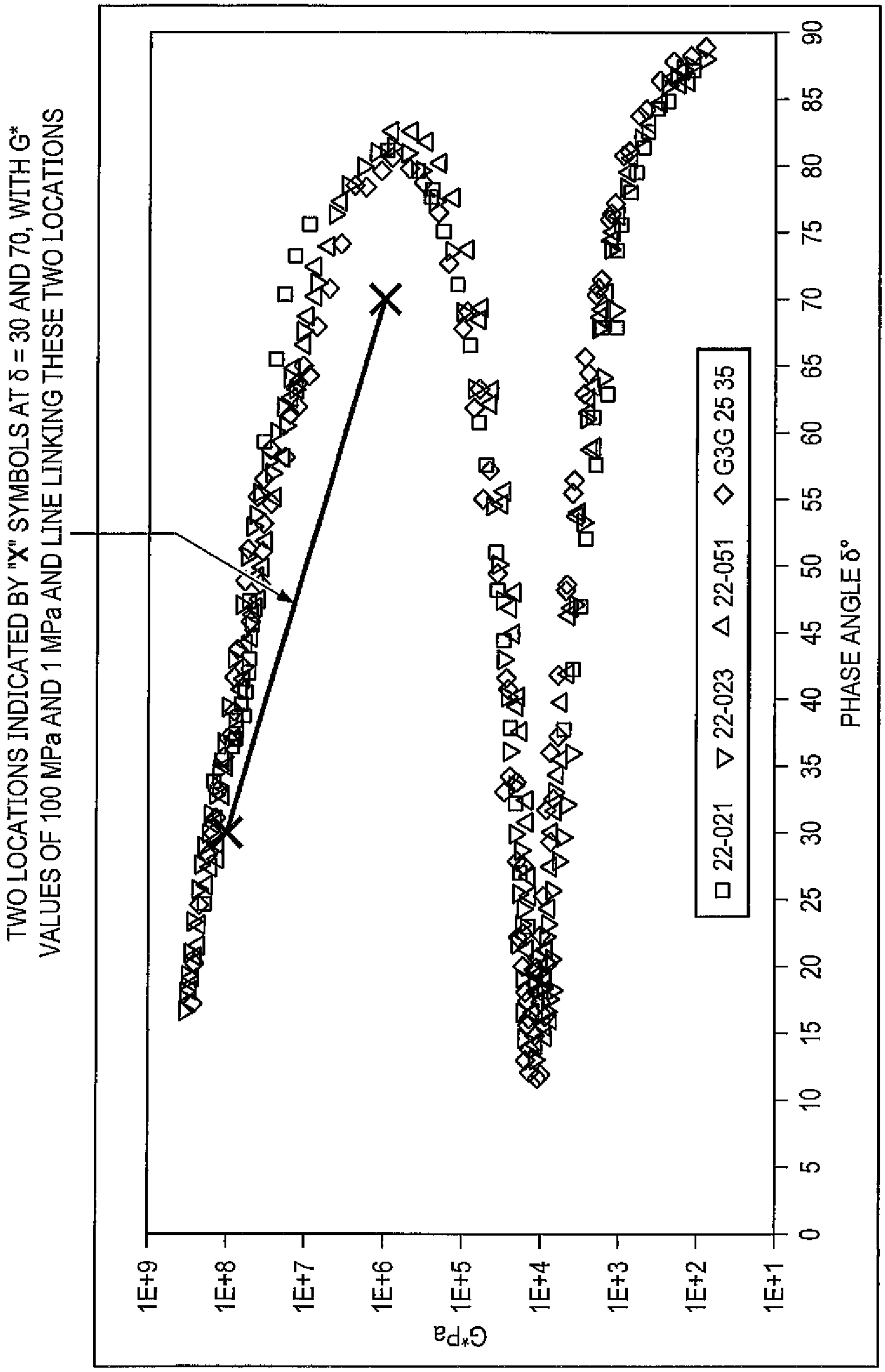
FIG. 2 is a Black Space diagram showing the stiffness (G*) versus phase angle (δ) values which were obtained for four test compositions exhibiting desirable relaxation properties.
Figure 3:
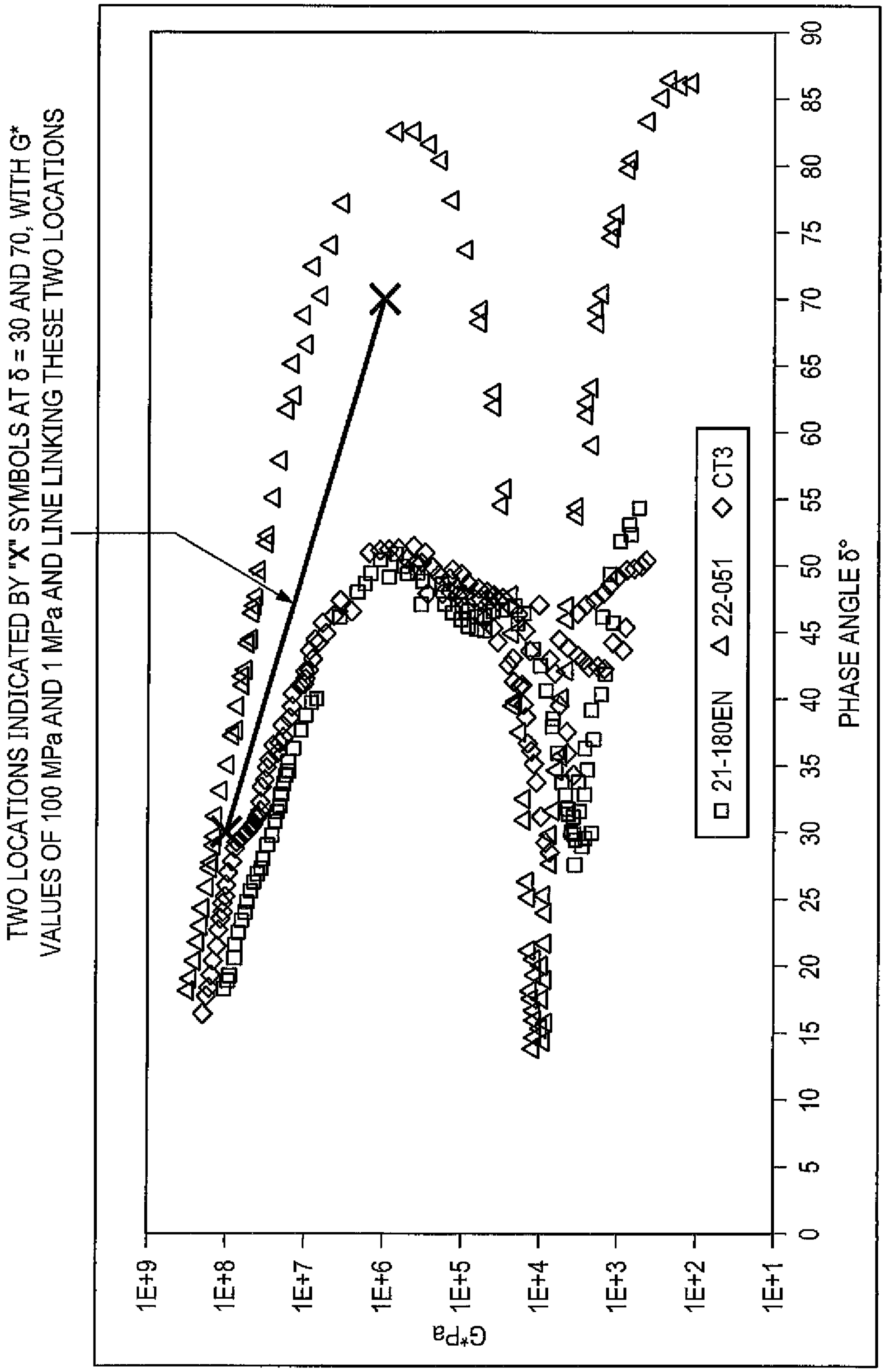
FIG. 3 is a Black Space diagram providing a comparison of two other test compositions which did not meet the preferred criteria for relaxation at critical stiffness.

In a more preferred embodiment of practicing the inventive method for selecting a sealant, the full set of DSR and BBR data is used to calculate/derive a "Black Space" diagram, of the type shown in FIGS. 2 and 3, that shows the relationship between the sealant's shear stiffness or shear modulus (G*) and its phase angle (δ).

The preferred steps in the testing and analysis processes are summarized in FIG. 1. As discussed above, the phase angle (δ) is a property inherent to viscoelastic materials and provides a quantification of a material's energy storage/relaxation properties vs. energy dissipation behavior at any given temperature and rate of testing. For example, a liquid with no energy storage capacity will have a phase angle of 90°, implying energy dissipation without energy storage (i.e., without elasticity). A perfectly elastic solid material with no energy dissipation capability will have a phase angle of 0°.

Viscoelastic materials can have phase angles ranging from 0° to 90° depending on their specific composition and the testing temperature and frequency. Generally speaking, for superior stress relaxation behavior at low and intermediate temperatures where cracking and fracturing are primary concerns, it is desirable for a viscoelastic solid material to have a phase angle in excess of at least about 60° and more preferably in excess of 70°. When a viscoelastic solid has a phase angle in excess of about 70° at low temperatures where stiffness values are relatively high (exceeding about 1 MPa), such a high phase angle indicates a strong energy dissipation capability retained by the sealant. This means that the sealant is still able to dissipate energy from mechanical loads and stresses by deformation that is recoverable, rather than undergoing fracture. Furthermore, if the material within the main working temperature range exhibits viscoelastic solid behavior, this ensures that no permanent viscous deformation will occur due to repeated strain movements experienced when a joint opens and closes with daily/seasonal/yearly temperature changes.

As stated, achieving a high phase angle is important for performance while maintaining viscoelastic solid behavior. Other desirable parameters are similar to those used with asphalt binders for hot-mix asphalt. One of these is a minimum phase angle of 45° which is described as the viscoelastic transition temperature in the literature. The temperature at which this occurs has been considered important as a control of cracking. A phase angle of 27° has been suggested as a control for asphalt binders in France for thermal cracking and provides a similar measure to the m-value of 0.300 used in the binder specifications (for example AASHTO M320, AASHTO M332) in the USA. This value is consistent with a binder stiffness that can lead to cracking. Consequently, these two additional measures have been shown as examples of the importance of understanding the performance of products with respect to cracking.

The use of phase angle to understand relaxation processes has been considered in the past for asphalt binders in paving applications, but has never been extended to sealants to estimate the climatic zone for which they would be suitable. Specifically, we summarize and note for reference:

| Phase angle (°) | Published work and use in asphalt binders |
|---|---|
| 27° | French workers used this as a suggested limit for cold temperature cracking. This value is very similar to the 26.8° computed by Rowe and published in 2014 in a CTAA publication. The value of 27° is consistent with the magnitude of the slope of the log stiffness versus time in the bending beam rheometer results when that value equals 0.300, which is used as a specification limit. |
| 42° | Suggested as a critical value by Pavel Kris in a 2020 CTAA publication |
| 45° | Suggested by French (1992) and UK workers (2004) as being related to cracking of asphalt mixes used for road paving. |

In a preferred embodiment of practicing the inventive method, a sealant is chosen that preferably has: (1) a phase angle that exceeds at least about 70°, with typical characteristic values around 80°, when its complex shear modulus (G*) is 1,000,000 Pa (1 MPa), and (2) a phase angle greater than 30° when the complex shear modulus (G*) is 100,000,000 Pa (100 MPa).

In the more preferred embodiment of the inventive method, the sealant is selected based on its Black Space diagram indicating that its phase angle is 70° or higher when the complex shear modulus (G*) is 1,000,000 Pa (1 MPa) and its phase angle is 30° or higher when the complex shear modulus (G*) is 100,000,000 Pa (100 MPa). Other phase angles could be considered between these two points, but for the method developed herein it is preferred that the data points of the Black Space plot lie above and to the right of the line connecting these two critical values. This concept is illustrated in FIG. 2.

Viscoelastic solid behavior is assessed by the smooth curve for G* versus frequency (referring to the Master Curve diagram) that is obtained when the complex shear modulus G* value is greater than 10,000 Pa (0.01 MPa). In these cases, the complex shear modulus versus frequency curve at a reference temperature of 25 °C is assessed by comparison to the sigmoid equation described by Richards, known as the generalized logistic equation. The root mean square error of the fit will preferably be less than 15% for the material to be assessed as a viscoelastic solid in this stiffness range. Typically, the $r^2$ value is above 0.95. For the four materials given in FIG. 2, these values were as follows:

| Material | Root mean square error, % | Regression coefficient, $r^2$ | Visco-elastic solid behavior in range >1e4Pa (Yes/No) |
|---|---|---|---|
| 22-021 | 4.93 | 0.9919 | YES |
| 22-023 | 5.99 | 0.9997 | YES |
| 22-051 | 4.83 | 0.9992 | YES |
| G3G | 5.17 | 0.9913 | YES |

FIG. 3 contrasts the materials developed with this process compared to two traditional materials, one was a laboratory asphalt-based sealant manufactured by Adventus Partners whereas the other was a typical competitive material available in the market. It can be seen in this figure that the non-inventive materials had lower phase angles when compared to the desirable properties.

Furthermore, as the grade of the base resins (asphalt or otherwise) and choice of formulation parameters (for example, use or non-use of plasticizers) is changed, the temperature at which the phase angle is greater than 70 degrees can be adjusted higher or lower (typically by adding or reducing one or more plasticizers), when considered at constant loading frequency, which is representative of a loading duration.

For asphalt road pavements, a common loading time associated with low temperature cracking is considered as 7200 seconds (0.00014 radians/second) or 2 hours since it is representative of a typical cooling rate that occurs in road pavements. The variation in peak phase angle and ability to dissipate energy and relaxation properties can be considered by studying the tangent of the phase angle (i.e., "tan δ") to assess the temperature at which the relaxation properties peak.

Figure 4:
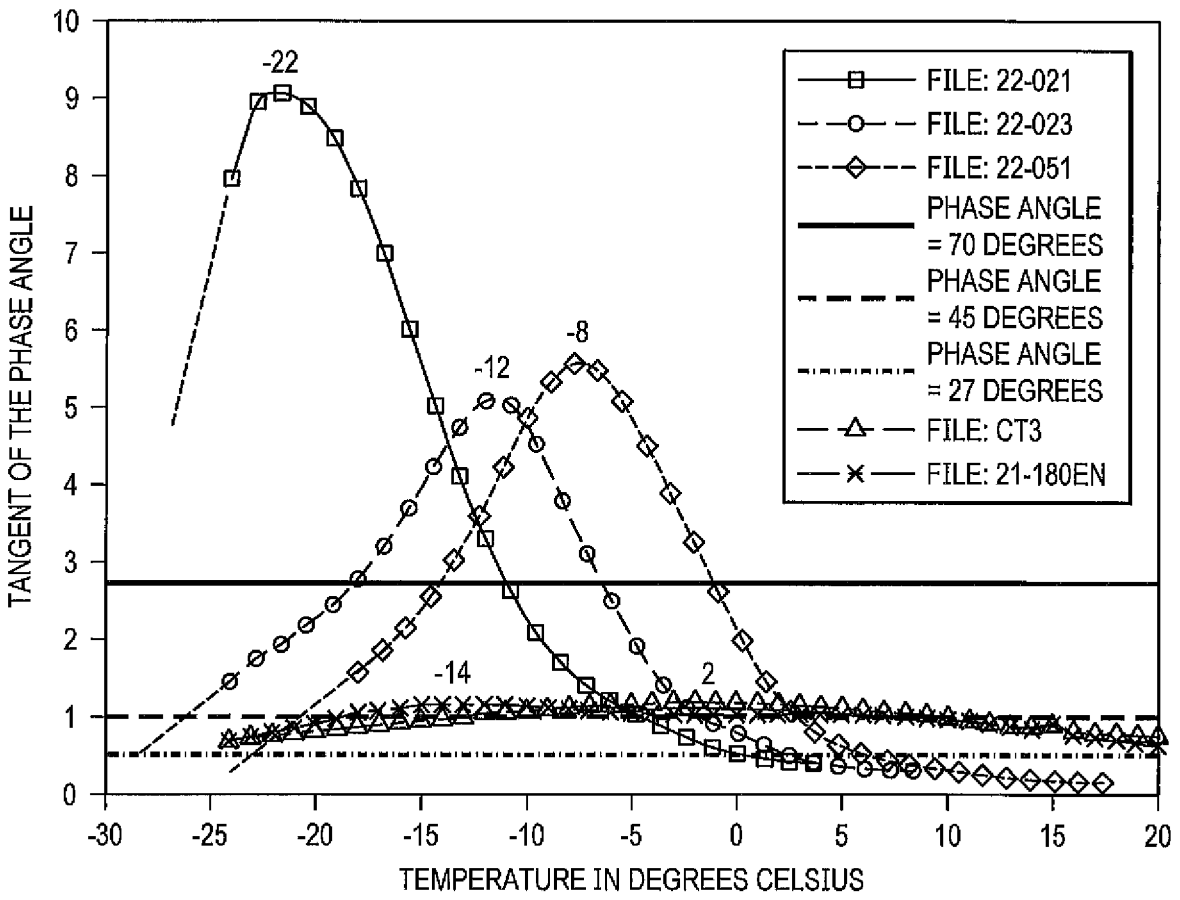
FIG. 4 is a plot of the tangents of the phase angles (δ) versus temperature (° C.) for five test compositions wherein isochrones of the tangents of the phase angles (δ) were calculated at a loading frequency equivalent to a time of 7200 seconds.

The tangent of the phase angle is chosen since it produces a better-defined peak when compared to a simple phase angle versus temperature relationship. This concept is illustrated in FIG. 4 which shows an example of the design of joint sealant materials for different low temperature climates. The three products have varying compositions with the aim to achieve low temperature performance over a range of expected climates that are typical of those found in the majority of the USA.

The temperature range between the peak of the tan δ curve and the temperature corresponding to a phase angle of 27° is typically in the range of 13° to 15 °C. Thus, a −8 °C peak in the tan & curve can be associated with a −22 °C value for the phase angle of 27 degrees, which would typically be the limit for paving grade binders based on a m-value in the specification. This is a useful method to assess the limits of cold temperature performance for a sealant—i.e., the climate range within which it might reasonably be expected to perform adequately. As shown in FIG. 4, through prudent use of formulation parameters, it is possible to adjust the position (e.g., by using one or more plasticizers) of the tan δ peak without losing the high degree of relaxation that occurs in a stiffness range of from 100,000 Pa (0.1 MPa) to 100,000,000 Pa (100 MPa).

Figure 5:
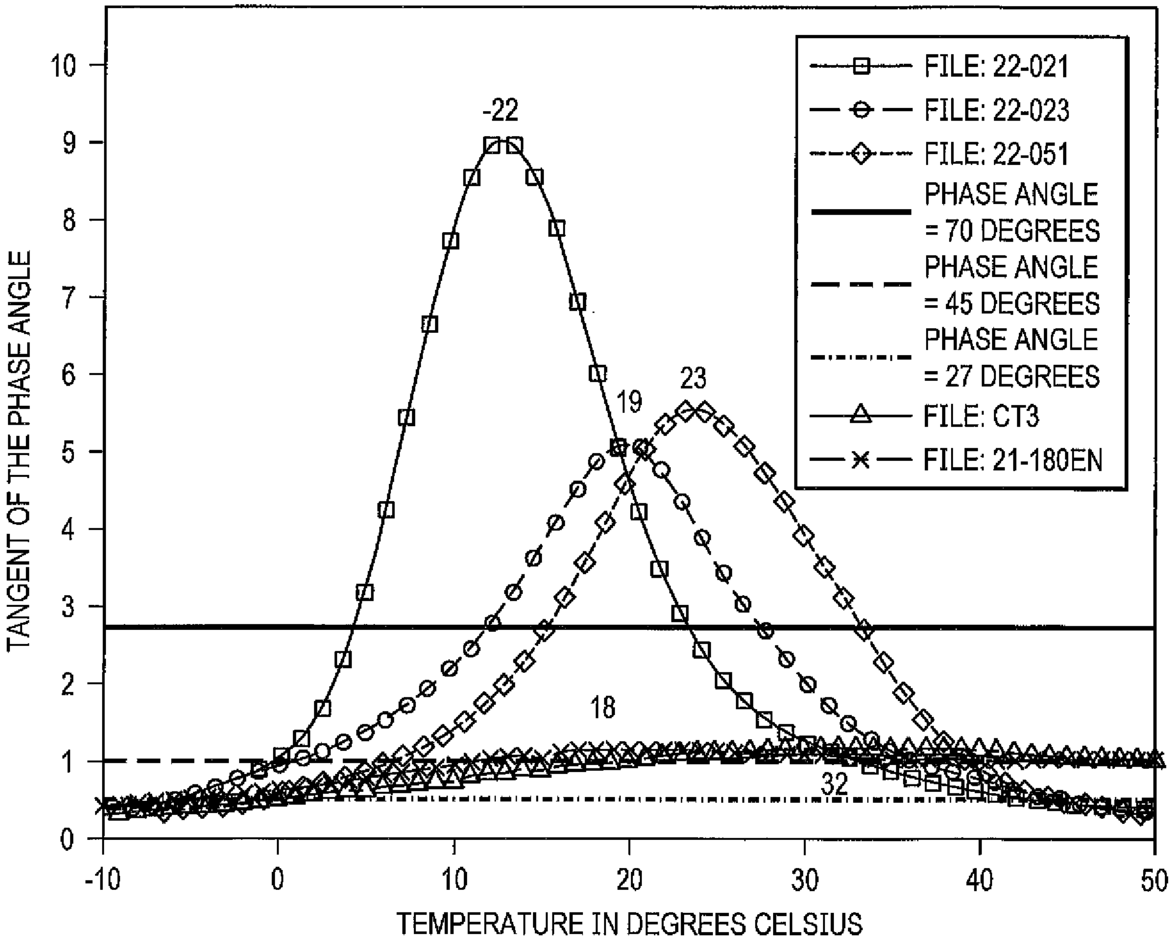
FIG. 5 is a plot of the tangents of the phase angles (δ) versus temperature (° C.) for the five test compositions wherein isochrones of the tangents of the phase angles (δ) were calculated at a loading frequency of 10 radians/second (1.59 Hz).

FIG. 5 shows a similar plot of the data analyzed in FIG. 4, but at a loading rate of 10 radians/second (1.59 Hz). This rate is preferred for the laboratory testing arena, since a loading rate of 7200 seconds (0.00014 radians/second) is much too slow to be of practical use in a laboratory testing environment. In this plot, the data is shifted to a higher temperature associated with the faster loading frequency compared to the data shown in FIG. 4.

Figure 6:
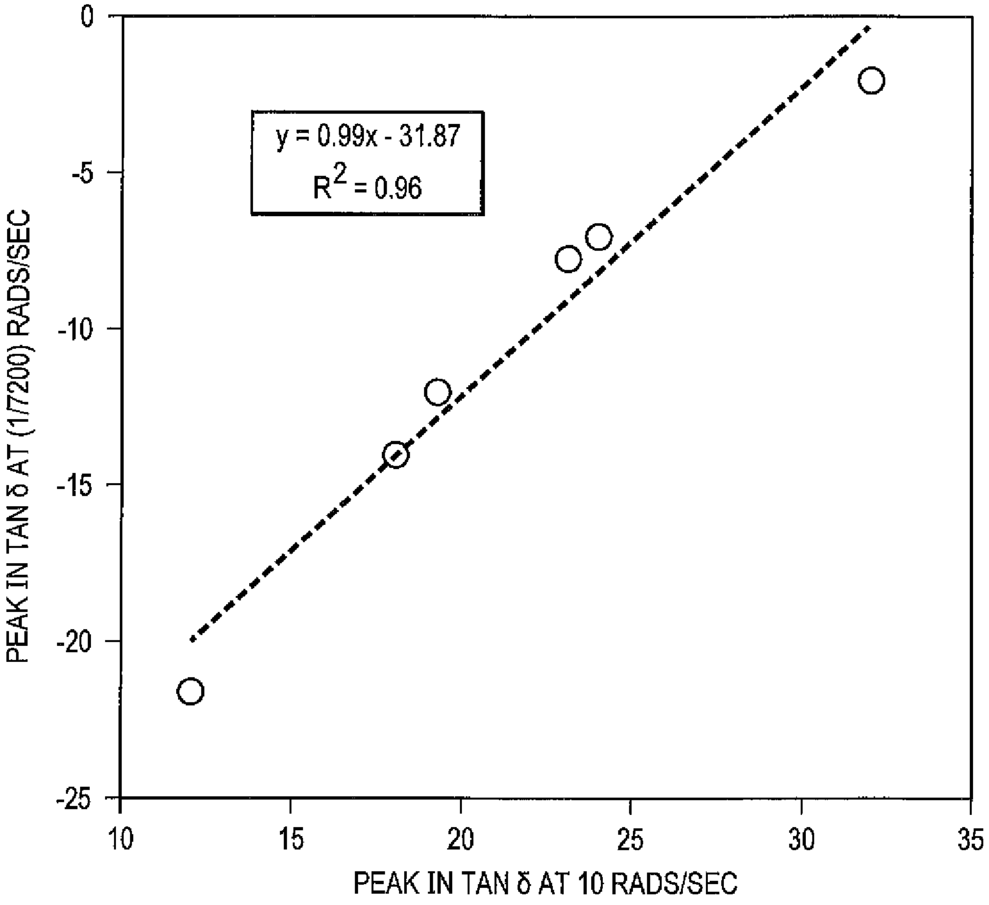
FIG. 6 is a plot showing the difference in peak locations for tan δ at 1/7200 radians per second versus 10 radians per second obtained for the six compositions shown in FIGS. 2 and 3.

FIG. 6 shows an analysis of the offset between the superior and less satisfactory materials evaluated herein. Here the offset in the peak of the tan δ curve is an average of approximately 32 °C. To this offset value of 32 °C, we must also add the typical offset value of 13-15 °C to reliably predict the temperature at which the tan δ curve intersects the temperature corresponding to the critical phase angle of 27° (as previously explained for FIG. 4). This results in an average offset value of 46 °C when the testing is performed at 10 radians/sec (1.59 Hz).

We recognize that different offset values can be used in the design of products. These examples show how data at 10 radians/second, a rate very practical for the lab testing environment, can be used to assess cold temperature performance with an average offset value of 46 °C. Thus, we have assessed that the limiting cold temperature requirement based on the minimum phase angle requirement of 27° can be calculated by determining the temperature at which the tan δ peaks, at a loading rate of 10 radians/second and deducting 46 °C. Thus, [$T_{\delta,crit}$=$T_{\delta\_peak}$, 10 rads -46], where $T_{\delta,crit}$ is the defining low temperature performance and $T_{\delta\_peak}$, 10 rads is the peak obtained in the tan δ when an isochrone is obtained at 10 radians/second.

Further, the quality control of the product after production can be assessed by the evaluation of an isotherm, either calculated from a master curve analysis as outlined in the process shown in FIG. 1, or by conducting a laboratory experiment at 10 radians per second where the temperature is changed in a stepwise method.

The following examples are provided for illustration purposes and are not intended to limit the invention in any way.

Example 1

The following crack and joint sealant compositions were prepared or obtained for testing:

G3G was a sealant formulated and manufactured with the objective of achieving the rheological properties of the current invention. G3G was a pine rosin-ester based sealant which included pigments to make it Portland cement concrete gray and was modified with SBS polymer;

AML 22-051 was a laboratory sealant formulated with the objective of meeting the rheological properties of the current invention. AML 22-051 had a composition similar to G3G, but without any pigmentation;

AML 22-021 was a laboratory sealant formulated with the objective of meeting the rheological properties of the current invention. AML 22-021 had the same composition as G3G, but with 6.3% by weight of the pine rosin ester component replaced with an equal amount of unrefined tall oil to act as a plasticizer;

AML 22-023 was a laboratory sealant formulated with the objective of meeting the rheological properties of the current invention. AML 22-023 had the same composition as G3G, but with 3.1% by weight of the pine rosin ester component replaced with an equal amount of unrefined tall oil to act as a plasticizer;

21-180EN was a laboratory formulated asphalt-based sealant similar to many commonly available hot-applied asphalt sealants, comprising asphalt, plasticizer, virgin SBS polymers, and post-consumer tire rubber; and CT3 was a commercially available, hot-applied, asphalt-based crack and joint sealant marketed for California Department of Transportation specifications (CalTrans Type 3).

In accordance with the method of the present invention, these sealant compositions were subjected to DSR and BBR tests as described above.

FIG. 2 is a Black Space diagram showing the shear stiffness (G*) versus phase angle (δ) values which were obtained for compositions G3G, AML 22-021, AML 22-023, and AML 22-051.

FIG. 3 is a Black Space diagram showing the stiffness (G*) versus phase angle (δ) values which were obtained for the more common asphalt-based sealants 21-180EN and CT3 as compared to AML 22-051.

FIG. 4 is a plot of the tangents of the phase angles (δ) versus temperature (° C.) obtained for compositions AML 22-021, AML 22-023, AML 22-051, CT3, and 21-180EN. In FIG. 4, isochrones of the tangents of the phase angles (δ) were calculated at a loading frequency equivalent to a time of 7200 seconds.

FIG. 5 is also a plot of the tangents of the phase angles (δ) versus temperature (° C.) obtained for compositions AML 22-021, AML 22-023, AML 22-051, CT3, and 21-180EN. In FIG. 5, isochrones of the tangents of the phase angles (δ) were calculated at a loading frequency of 10 radians/second (1.59 Hz).

FIG. 6 shows the difference in peak locations for tan δ at 1/7200 radians per second versus 10 radians per second obtained for the six compositions shown in FIGS. 2 and 3.

In accordance with the inventive test procedure, the compositions identified as providing qualifying thermal performance and stress relaxation characteristics were those: (1) Having a phase angle δ>30° at G*=100 MPa; (2) Having a phase angle δ>70° at G*=1 MPa; (3) Having a phase angle δ greater than the value dictated by the line connecting points of 30°/100 MPa and 70°/1 MPa; (4) Having a phase angle greater that 27° when a critical frequency corresponding to the loading time of 7200 seconds is considered calculated from the temperature at the peak value minus 14 °C; and (5) Acting as a viscoelastic solid when the stiffness is greater than 10,000 Pa (in other words, the root mean square error of the fit of the Master Curve (i.e., the curve of the complex shear modulus of the composition versus frequency at a reference temperature of 25 °C) is less than 15% in comparison to the sigmoid equation).

The results of this testing for the six compositions shown in FIGS. 2 and 3 were as follows:

| | Requirement | | | | |
|---|---|---|---|---|---|
| Material | 1<br>δ at 100 MPa >30° | 2<br>δ a 1 MPa >70° | 3<br>>than the value dictated by the line indicated by points of 30°/100 MPa and 70°/1 MPa. | 4<br>Low temperature, where δ >27° | 5<br>Visco-elastic solid behavior in range >1e4Pa (Yes/No) |
| 22-021 | YES | YES | YES | −34 | YES |
| 22-023 | YES | YES | YES | −27 | YES |
| 22-051 | YES | YES | YES | −23 | YES |
| G3G | YES | YES | YES | −22 | YES |
| 21-180EN | NO | NO | NO | −28 | YES |
| CT3 | NO | NO | NO | −14 | YES |

Example 2

An additional test, or tests, can be included in the inventive method to determine whether the rheological properties of a crack and joint sealant composition will be maintained after aging. Properties of interest evaluated in the aging test can include, but are not limited to, phase angle response, viscoelastic solid behavior when stiffness is greater than 1e4 Pa, and thermo-rheologically simple behavior.

The use of a Pressure Aging Vessel (PAV) is the aging technique preferred for use in the inventive method. The PAV aging conditions will preferably be maintained for a minimum of 20 hours, with 40 hours or up to 80 hours or more being more preferred. An example of an alternative aging technique is weatherometer exposure.

Figure 7:
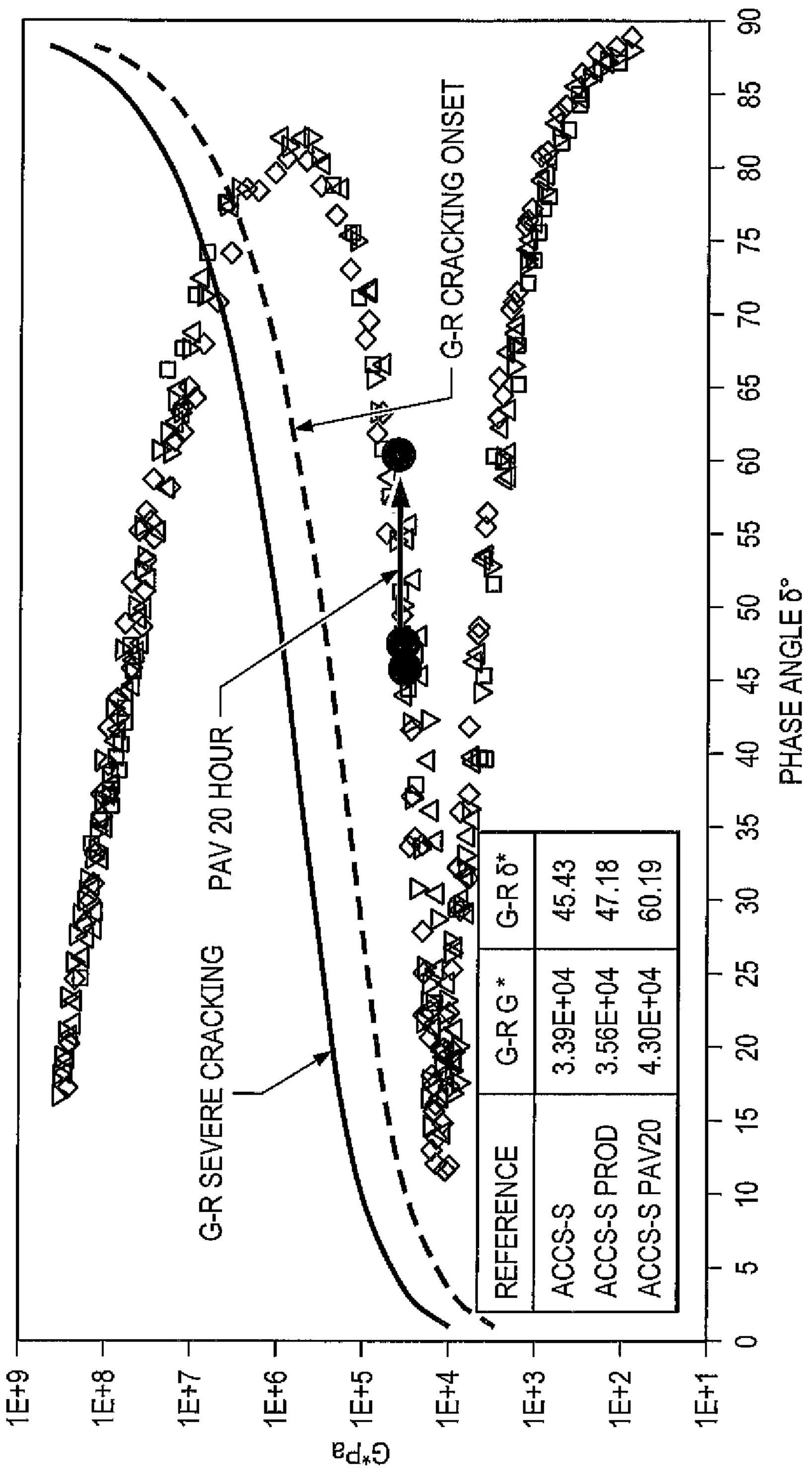
FIG. 7 is a Black Space diagram that provides a comparison of unaged materials formulated to meet the preferred embodiment of the inventive method with those that represent an aged material of the same formulation using a Pressure Aging Vessel (PAV) with an aging duration of 20 hours.

FIG. 7 is a Black Space diagram comparing an unaged fresh sample of Concrete CamoSeal (a rosin-ester based crack and joint sealant material available from Adventus Material Strategies) with an unaged production lot sample of Concrete CamoSeal and a sample of Concrete CamoSeal that was subjected to 20 hours of PAV conditioning. The properties of the Concrete CamoSeal product shown in FIG. 7 were minimally changed after aging.

Thus, the present invention is well adapted to carry out the objects and attain the ends and advantages mentioned above as well as those inherent therein. While presently preferred embodiments have been described for purposes of this disclosure, numerous changes and modifications will be apparent to those in the art. Such changes and modifications are encompassed within this invention as described in the claims.

What is claimed is:

1. A method of determining a suitability of a composition for sealing cracks and joints in pavement surfaces, the method comprising deriving a rheological profile of the composition over a stiffness range of from at least as low as 10,000 Pa to at least as high as 100,000,000 Pa, and the rheological profile of the composition being derived by a process comprising steps of:

a) testing the composition in a Dynamic Shear Rheometer (DSR) at a plurality of selected DSR test frequencies, in a range of from 0.01 radians/second to 10 radians/second, for a plurality of selected DSR test temperatures, in a range of from 0 °C and 100 °C, to determine values of a maximum applied stress, a maximum resultant strain, and a time lag between occurrence of the maximum applied stress and the maximum resultant strain, for the selected DSR test frequencies at the selected DSR test temperatures;

b) calculating complex shear modulus (G*) values of the composition, for the selected DSR test frequencies at the selected DSR test temperatures, using the values of the maximum applied stress and the maximum resultant strain determined in step (a);

c) determining phase angle (δ) values of the composition, for the selected DSR test frequencies at the selected DSR test temperatures, using the time lag between occurrence of the maximum applied stress and the maximum resultant strain determined in step (a);

d) optionally testing the composition in a Bending Beam Rheometer (BBR) at a plurality of selected BBR test temperatures in a range of from −40 °C to 0 °C to determine (i) higher stiffness values of the composition for the selected BBR test temperatures and (ii) a bending creep stiffness of the composition over a loading time of from 0 seconds to 240 seconds, and using, by transposition, the higher stiffness values and the bending creep stiffness to provide complex shear modulus (G*) values and phase angle (δ) values using transposition frequencies (expressed in radians per second) which are an inverse of the loading time;

e) calculating, using the complex shear modulus (G*) values calculated in step (b) and the phase angle (δ) values determined in step (c), as well as the complex shear modulus (G*) values and the phase angle (δ) values provided by step (d) if conducted, a Master Curve for the composition that shows a relationship between complex shear modulus (G*) and phase angle (δ) for the composition expressed as a function of frequency and temperature;

f) using the complex shear modulus (G*) values calculated in step (b) and the phase angle (δ) values determined in step (c), as well as the complex shear modulus (G*) values and the phase angle (δ) values provided in step (d) if conducted, to construct a Black Space Diagram that shows a relationship between complex shear modulus (G*) and phase angle (δ) for the composition corresponding to an entire range of the selected DSR test temperatures and the selected DSR test frequencies; and g) determining whether the phase angle (δ) of the composition shown on the Black Space Diagram is always above a phase angle evaluation line that connects the ordinates δ=27°/G* =100 MPa and δ=70°/G*=1 MPa.

2. The method of claim 1 further comprising determining whether the phase angle (δ) of the composition on the Black Space Diagram is at least 30° when the complex shear modulus (G*) value of the composition is 100,000,000 Pa.

3. The method of claim 1 further comprising determining whether the phase angle (δ) of the composition on the Black Space Diagram is at least 30° when the complex shear modulus (G*) value of the composition is 1,000,000 Pa.

4. The method of claim 1 further comprising determining whether the composition demonstrates viscoelastic solid behavior, as determined by fitting the Master Curve of the composition to the rheological profile of the composition at complex shear modulus (G*) values greater than 10,000 Pa, and determining whether the Master Curve of the composition conforms to a sigmoid curve, with a root mean square error of less than 15%.

* * * * *